United States Patent [19]
Marko et al.

[11] Patent Number: 5,502,437
[45] Date of Patent: Mar. 26, 1996

[54] RECEIVER ISOLATION SCHEME

[75] Inventors: Paul D. Marko, Ft. Lauderdale; Kenneth D. Alton, Coral Springs, both of Fla.

[73] Assignee: Motorola, Inc., Schaumburg, Ill.

[21] Appl. No.: 233,016

[22] Filed: Apr. 25, 1994

[51] Int. Cl.⁶ ............................. G08B 5/22; G08B 23/02
[52] U.S. Cl. .................. 340/825.47; 340/825.14
[58] Field of Search ........................ 340/825.1, 825.14, 340/825.11, 825.12, 825.13, 825.44, 825.47, 825.48, 825.26, 825.27; 455/343, 38.3

[56] References Cited

U.S. PATENT DOCUMENTS

| | | |
|---|---|---|
| 5,089,813 | 2/1992 | Deluca . |
| 5,123,100 | 6/1992 | Hisada et al. ................ 340/825.14 |
| 5,168,271 | 12/1992 | Hoff .............................. 340/825.47 |
| 5,220,566 | 6/1993 | Ikenoue ......................... 340/825.1 |
| 5,266,945 | 11/1993 | Peek et al. .................... 340/825.47 |
| 5,274,843 | 12/1993 | Murai et al. .................. 340/825.47 |
| 5,309,153 | 5/1994 | Gaskill et al. ................. 340/825.47 |
| 5,309,154 | 5/1994 | Mun et al. ..................... 340/825.47 |

OTHER PUBLICATIONS

ETSI, ETS 300 131 (prl), Jun. 1993, Second Edition, pp. 1–265.

Primary Examiner—Alyssa H. Bowler
Assistant Examiner—Mark H. Rinehart
Attorney, Agent, or Firm—Barbara R. Doutre; John G. Rauch

[57] ABSTRACT

A method for providing isolation between first and second receivers (314, 316) located within a radio (300) is configured in software. The first receiver (314) synchronizes to the second receiver (316) in their respective battery saver modes such that the two receivers are never on at the same time.

14 Claims, 3 Drawing Sheets

RECEIVER ISOLATION SCHEME

TECHNICAL FIELD

This invention relates to communication devices, and more specifically to a receiver isolation method.

BACKGROUND

The demand for additional features being added to communication products has increased the development of the communication product industry. Recent developments in wireless communication technology, such as the Second Generation Cordless Telephone (CT2) manufactured by Motorola Inc., provide multi-service technology by including a pager within the telephone handset. In these types of products which typically include separate receivers for each service, a new technical hurdle must be addressed; cross radio frequency interference (RFI) between the separate receiver systems which can degrade the radio performance. Controller circuitry providing the multi-system timing protocols, must be left on if both receivers are on at the same time which can also cause degradation in radio sensitivity. Present approaches to solving interference problems include shielding and clock shift networks but both of these approaches are costly. Hence, there is a need for a method to isolate one receiver from the other while still being able to maintain the protocol of each system (e.g. the pager's protocol and the CT2 radio's protocol).

DETAILED DESCRIPTION OF THE PREFERRED EMBODIMENT

In the preferred embodiment of the invention an isolation scheme provides a method for reducing receiver interference in a communication device, such as a radio telephone handset with integral pager. Since pager operation in standby mode provides a receiver duty cycle that allows substantial battery conservation, and digital handsets in compliance with protocols such as the Second Generation Cordless Telephone (CT2) and Digital European Cordless Telephone (DECT) also operate in standby modes with receiver duty cycles that allow battery conservation, a product which integrates a paging receiver with a digital telephone receiver, can be configured to reduce the receiver to receiver interference by time multiplexing the receiver duty cycles in standby mode.

Figure 1:
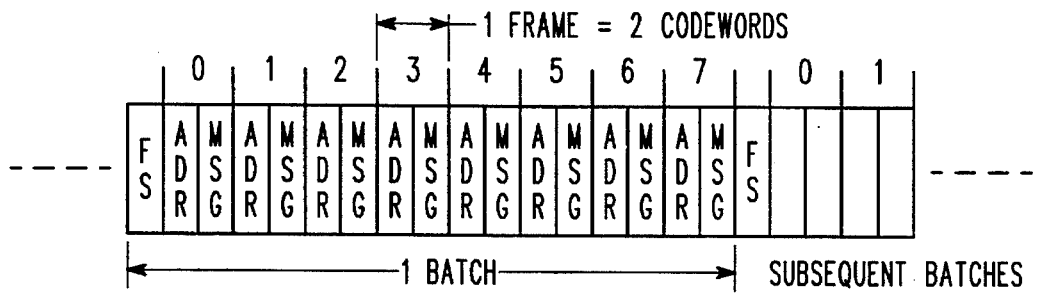
FIG. 1 shows a drawing of a prior art POCSAG paging format.

FIG. 1 of the accompanying drawings shows a typical prior art pager protocol known in the art as POCSAG (Post Office Code Standardization Advisory Group). This basic signaling pattern 100, used for a pager receiver in standby mode, is a sequence of coded binary data. The POCSAG code is a synchronous paging format that allows pages to be transmitted from a base station in a simple batch structure. The POCSAG code format consists of a preamble and one or more batches of codewords. The POCSAG paging format precisely defines what periods of time a paging receiver must be active in order to receive pages from the system and provides improved battery saving capability and increased code capacity. Information is transmitted in batches with each batch broken down into a frame sync followed by eight frames. Each frame is further divided into two codewords; an address code word followed by a message codeword. The frames are numbered 0 to 7 dividing the pager population into 8 groups. Each pager is assigned to one of the eight frames according to the three least significant bits of its 21 bit identity and will only examine codewords in that frame. Power is removed from the pager receiver during all frames other than pre-coded ones, thus extending pager battery life.

Figure 2:
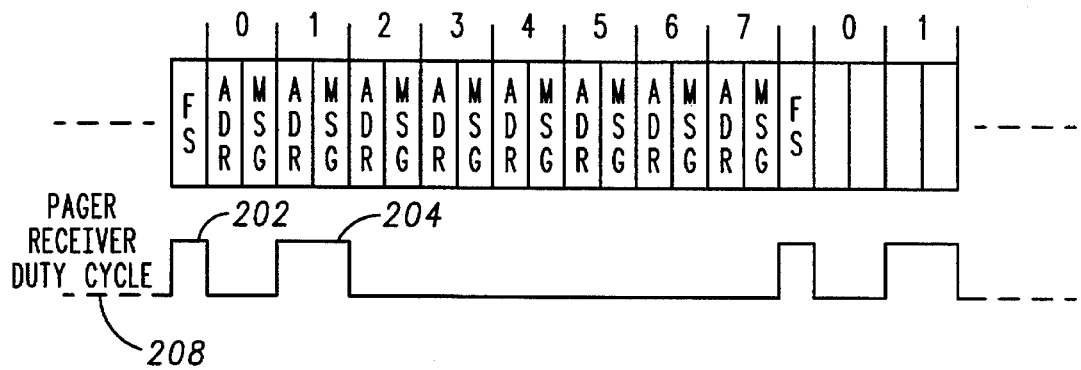
FIG. 2 shows a timing diagram of a typical pager receiver duty cycle relative to the prior art POCSAG paging format.

A typical prior art pager receiver duty cycle for an address ending in 001 is shown is FIG. 2 of the accompanying drawings. The pager receiver duty cycle 208 shows a pager scan 204 taking place during frame 1 of the paging protocol and following frame sync 202. Note that the pager duty cycle is slave to, or determined by, the pager transmitter and therefore will be a master in a handset with other receivers.

Figure 3:
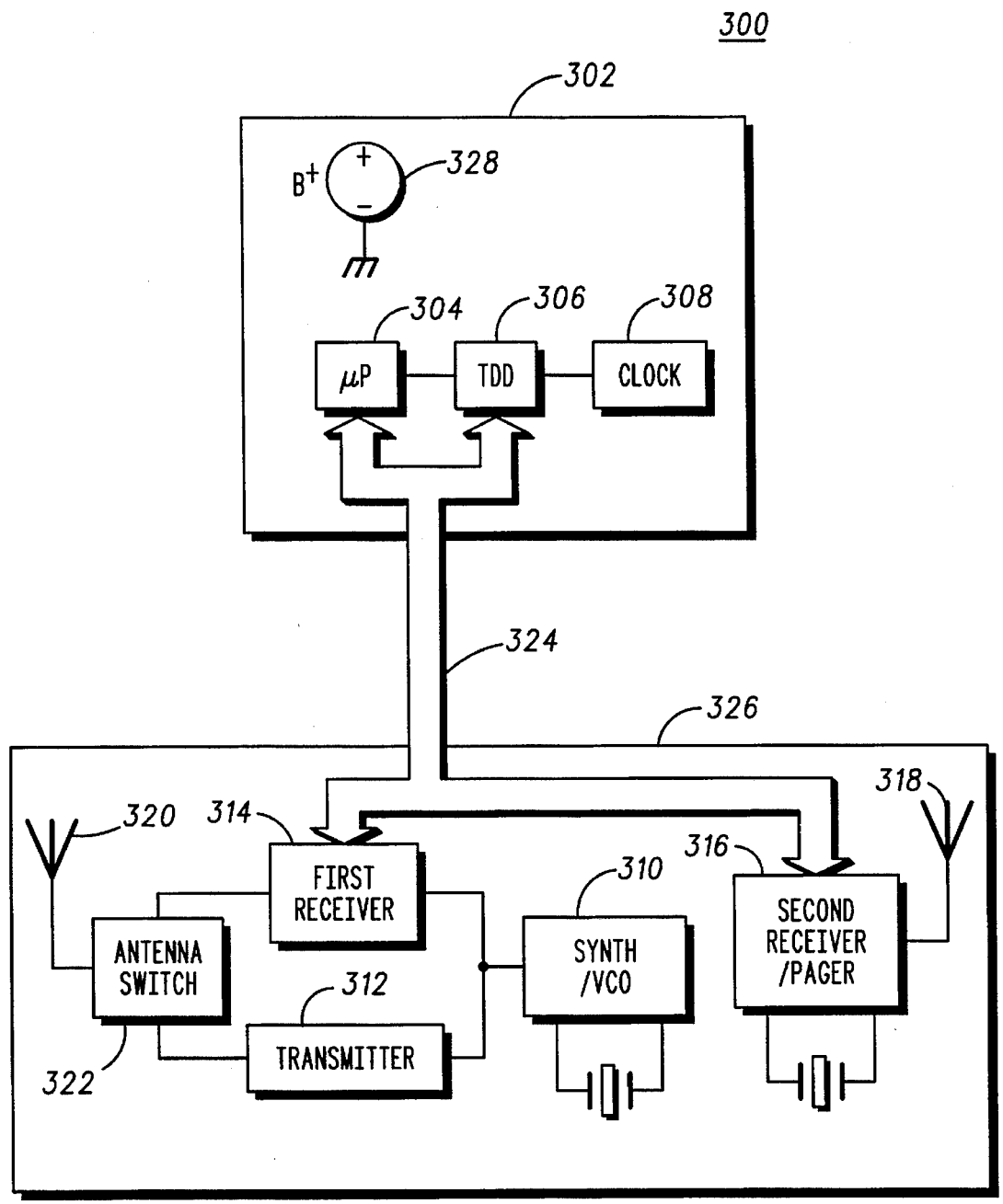
FIG. 3 shows a block diagram of a radio in accordance with the present invention.

Referring now to FIG. 3, a block diagram of a radio 300 in accordance with the present invention is shown. In the preferred embodiment of the invention the radio 300 is a CT2 radio with integral pager. Included in the radio 300 is a controller section 302 and a transceiver section 326 both powered from a supply 328. The controller section 302 includes a microprocessor 304 for controlling the functions of the radio 300, a time division duplexing section (TDD) 306 and a clock 308. The microprocessor interfaces with the TDD to transfer transmit data and receive data between the controller section 302 and the transceiver section 326. The microprocessor 304 also generates control signals to provide a battery saver mode, or standby mode, for the radio 300 which in the preferred embodiment follows a Common Air Interface (CAI) protocol hereby incorporated by reference to the Radio Equipment and Systems Common Air Interface Specification published by the European Telecommunications Standards Institute, France, June 1993. Also, included, but not shown, in controller section 302 is audio circuitry for providing audio to the user.

The transceiver section 326 includes an antenna 320 for receiving or transmitting a first RF (radio frequency) signal, and an antenna switch 322 for switching between a first receiver 314, which in the preferred embodiment is a radio receiver, and a transmitter 312. A second LO (local oscillator) signal is provided by a synthesizer/VCO section 310 for the first receiver 314 and transmitter 312. Also included in the transceiver section 326 is a second receiver 316, which in the preferred embodiment is a pager receiver, along with a second receiver antenna 318 for receiving a second RF signal. The transceiver section 326 and the controller section 302 are interfaced via a data/address bus 324. Other portions of the transceiver 326 such as a mixers, second local oscillator, amplifiers, demodulators, and filters are not shown. Both the first and second receivers scan for an incoming signal while in the standby mode under the control of controller section 302.

In the preferred embodiment of the invention the pager portion 316 of the CT2 handset receives a POCSAG signal which is decoded by the microprocessor 304. The standby mode, also known as battery saver mode, is executed by the microprocessor 304 in accordance with the POCSAG algorithm in order to reduce current drain and thus prolong the battery life of the radio 300 when the radio is not in use. In the paging system, once there is activity on the channel, the paging receiver synchronizes to the paging data format present at the channel, in this case the POCSAG format, and the paging duty cycle becomes fixed, or locked. Once locked, synchronization must be maintained as dictated by the POCSAG paging protocol; hence, the pager receiver duty cycle once established, becomes a master to other receiver duty cycles in the radio 300. Thus, the first receiver duty cycle can trigger from the paging receiver duty cycle. In the CT2 battery saver mode, the receiver scan cycle can be varied and therefore synchronized with the fixed paging cycle. Windows of non-scan time in the paging duty cycle can then be used for scanning CT2 communication channels before the next frame sync occurs. Since the scan time of the standby modes for the radio 300 do not overlap, interference between the two receivers 314 and 316 is reduced.

In CT2 systems, receiver standby duty cycles are established based on a maximum 1.4 second duty cycle as dictated by the CAI protocol. For incoming calls to a CT2 base station, the CT2 CAI specification requires that the base signal the handset for a minimum of 1.4 seconds. Since 40 channels are allocated to CT2, the handset must scan up to 40 channels at least once every 1.4 seconds for a predetermined scan time, or time frame, to insure prompt incoming call detection. A portion of the scan time is dedicated to the synthesizer lock time (SYNTH LOCK) and the channel marker frame detector (CHMF DET). Another portion of the scan time is dedicated to the receiver wake up time (XCVR WAKE UP). The typical receiver scan time for 40 channels is divided as shown in Table 1.

TABLE 1

| 1.0 ms | SYNTH LOCK |
|---|---|
| 2.5 ms | CHMF DET |
| 3.5 ms/chan = 140ms | |
| 140 ms | scan |
| 10 ms | XCVR WAKE UP |
| 150 ms | total |

The predetermined 150 ms receiver scan period, or predetermined scan window, is asynchronous in CT2 systems which then allows multiplexing with the paging receiver via the following algorithm:

Paging Frame=0 to 3, CT2 scan follows paging frame

Paging Frame=4 to 7, CT2 scan follows frame sync.

Once the paging duty cycle is established and the location of the paging time frame within the paging duty cycle is determined, the radio receiver 314 can be synchronized, or triggered, to the paging time frame. Examples for paging frame 1 and paging frame 5 are depicted in FIGS. 4 and 5 respectively.

Figure 4:
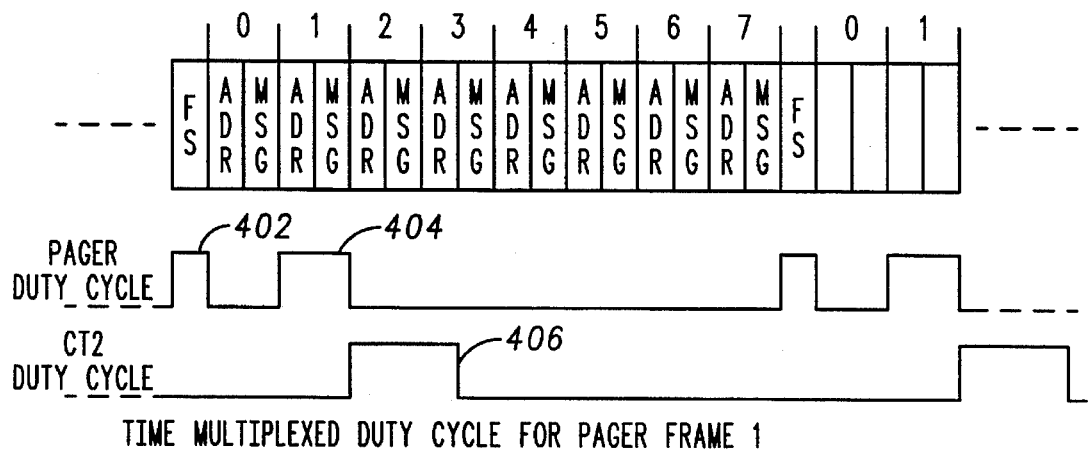
FIG. 4 shows a timing diagram for a first example of a radio receiver duty cycle relative to a pager receiver duty cycle in accordance with the present invention.
Figure 5:
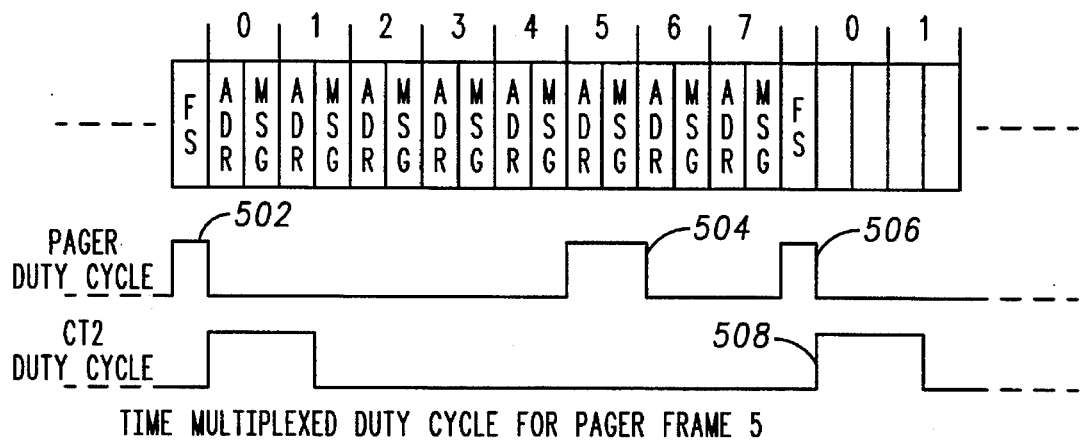
FIG. 5 shows a timing diagram for a second example of a radio receiver duty cycle relative to a pager receiver duty cycle in accordance with the present invention.

Referring now to FIG. 4, a cycle starting with frame sync 402 is followed by a pager scan 404 during frame 1. This results in the CT2 radio receiver scan 406 following directly after the paging frame while not overlapping with the paging frame. In FIG. 5, a new cycle begins with frame sync 502 followed by the pager scan 504 occurring at frame 5. This results in the CT2 radio receiver scan 508 following the next frame sync 506 in the subsequent cycle of the pager receiver duty cycle. By creating isolated receiver scanning between the pager receiver 316 and the radio receiver 314, interference between the two receivers is reduced. Thus, the multiplexing of the battery saver duty cycles of two independent systems provides an improvement in RFI isolation between the two receivers 314 and 316. Such an approach, preferably implemented in software and executed by controller section 302, reduces the cost of providing receiver to receiver isolation with other means, such a shielding and decoupling.

The method as described by the invention, coordinates the use of each battery saver mode so that only one receiver is on at a time. By multiplexing the radio and pager scan times there is also a reduction in digital noise, because a portion of the controller circuitry using the TDD 306 and clock 308 can be turned off while in the paging scan mode.

The scan time for the radio receiver can be non-contiguous and thus split up over the duty cycle as long as the radio scan time falls within the non-scan windows of the pager duty cycle. For example, the first twenty channels could be scanned by the radio receiver directly after the pager scan and then followed by a non-scan portion of time before the next twenty channels are scanned. The scan time for the radio receiver could also be spread over the entire non-scan paging time if desired however, the increase in current drain, which is the purpose of the battery saver mode to begin with, would make this counterproductive. Another advantage to multiplexing the duty cycles is that the overall current peaks are reduced, because the two receivers are not turned on at the same time.

By providing a means for coordinating two different receivers with two different protocols, such as POCSAG and CT2, the two receivers can be isolated from each other while still providing multi-system protocols in a single communication device.

It can be seen by those skilled in the art that the invention is not so limited. The isolation scheme as described by the invention could be applied to other cordless telephone communication systems such as DECT. The same approach could also be applied if the radio receiver and pager receiver were integrated into one integrated circuit. A Golay protocol format could be used for the standby mode for the pager receiver and different baud rates could be applied for the CT2 scan cycle. Different scan times could be used as long every channel were scanned at least once throughout the duty cycle. Hence, the receiver isolation scheme as described by the invention provides an efficient and cost effective means for improving RFI isolation between receivers.

What is claimed is:

1. A method for coordinating the synchronization of first and second receivers within a communication device, the method comprising the steps of:

scanning for a first incoming signal at the first receiver for a predetermined time frame using a first communication protocol;

scanning for a second incoming signal at the second receiver for a predetermined time frame using a second communication protocol; and altering the predetermined time frame of the second communication protocol in response to the predetermined time frame of the first communication protocol.

2. A method as described in claim 1, wherein the step of altering the predetermined time frame of the second communication protocol includes the steps of:

at the first receiver:
   determining a timing location of the predetermined time frame within the first communication protocol; and at the second receiver:
   determining a timing location of the predetermined time frame within the second communication protocol; and adjusting the timing location of the predetermined time frame within the second communication protocol such that it does not overlap with the timing location of the predetermined time frame for the first communication protocol at the first receiver.

3. A method as described in claim 2, wherein the steps of determining timing locations of the predetermined time frames within the first and second communication protocols include the further steps of:

determining duty cycles for the first and second communication protocols, the duty cycle of the second communication protocol characterized by a first half and a second half;

and wherein the step of adjusting the timing location of the predetermined time frame within the second communication protocol includes the steps of:

triggering the second receiver predetermined time frame such that it follows the first receiver predetermined time frame when the first receiver predetermined time frame falls within the first half of the duty cycle for the second communication protocol; and triggering the second receiver predetermined time frame such that it falls into the first half of the duty cycle for the second communication protocol when the first receiver predetermined time frame falls within the second half of the duty cycle for the second communication protocol.

4. A method for coordinating non-overlapped scanning between a radio receiver and a pager receiver in a single communication device, the method comprising the steps of:

establishing a scanning duty cycle for the pager receiver using a first communication protocol;

establishing a scanning duty cycle for the radio receiver using a second communication protocol; and altering the scanning duty cycle for the radio receiver using the scanning duty cycle of the pager receiver such that the scanning duty cycles do not overlap.

5. A method as described in claim 4, wherein the step of establishing a scanning duty cycle for the pager receiver includes the steps of:

receiving information batches from a base station;

dividing each batch into a frame sync followed by eight paging frames, wherein the eight paging frames comprise paging frames zero through seven;

starting the scanning duty cycle of the pager receiver with a frame sync; and scanning from the pager receiver during a predetermined portion of the eight paging frames.

6. A method as described in claim 5, wherein the method of altering the scanning duty cycle for the radio receiver using the scanning duty cycle of the pager receiver includes the steps of:

scanning from the radio receiver for a predetermined portion of time following the paging frame when the paging frame is zero to three, such that no overlap occurs between the paging frame and the radio receiver scan time; and scanning from the radio receiver for a predetermined portion of time following the frame sync when the paging frame is four to seven, such that no overlap occurs between the paging frame and the radio receiver scan time.

7. A communication device having first and second receivers, each receiver being controlled by a first and a second communication protocol respectively, said first communication protocol alterable in response to the second communication protocol, such that the two communication protocols do not overlap, wherein the timing of the second communication protocol is altered in response to the timing of the first communication protocol.

8. A communication device as described in claim 7, wherein the first receiver is a pager receiver.

9. A communication device as described in claim 8, wherein the controller section places the pager receiver in a POCSAG battery saver format and the second receiver in a CAI (Common Air Interface) battery saver format.

10. A communication device including first and second receivers, the first receiver having a first receiver duty cycle and the second receiver having a second receiver duty cycle, each receiver duty cycle having a predetermined receiver time frame, and the predetermined receiver time frame of the first receiver duty cycle synchronizing from the predetermined receiver time frame of the second receiver duty cycle.

11. A communication device as described in claim 10, wherein the predetermined receiver time frames of each of the first and second receiver duty cycles do not overlap.

12. A communication device as described in claim 11, wherein the predetermined receiver time frame of the first duty cycle is split up into non-contiguous frames.

13. A communication device as described in claim 11, wherein the second receiver duty cycle is further divided into first and second halves, the predetermined receiver time frame for the second receiver duty cycle falling within the first half of the second receiver duty cycle, and the predetermined receiver time frame of the first receiver duty cycle occurring during a portion of the first half of the second receiver duty cycle while not overlapping with the predetermined receiver time frame within the second receiver duty cycle.

14. A communication device as described in claim 13, having subsequent first and second receiver duty cycles, wherein the predetermined receiver time frame of the second receiver duty cycle falls within the second half of the second receiver duty cycle, and the predetermined receiver time frame of the first receiver duty cycle occurs during a portion of the first half of the subsequent second receiver duty cycle while not overlapping with the predetermined receiver time frame within the subsequent second receiver duty cycle.

* * * * *